United States Patent
Green et al.

(10) Patent No.: US 10,136,408 B1
(45) Date of Patent: Nov. 20, 2018

(54) DETERMINING HIGH VALUE GEOGRAPHIC LOCATIONS

(71) Applicants: Colby Green, Raleigh, NC (US);
Andrew Schrader, Raleigh, NC (US);
Vamshi Guduguntla, Raleigh, NC (US)

(72) Inventors: Colby Green, Raleigh, NC (US);
Andrew Schrader, Raleigh, NC (US);
Vamshi Guduguntla, Raleigh, NC (US)

( * ) Notice: Subject to any disclaimer, the term of this patent is extended or adjusted under 35 U.S.C. 154(b) by 0 days.

(21) Appl. No.: 15/679,694

(22) Filed: Aug. 17, 2017

(51) Int. Cl.
*H04W 64/00* (2009.01)
*H04W 4/029* (2018.01)

(52) U.S. Cl.
CPC ......... *H04W 64/003* (2013.01); *H04W 4/029* (2018.02)

(58) Field of Classification Search
CPC ............................. H04W 64/003; H04W 4/028
USPC ............... 455/456.2; 340/524; 701/424, 521
See application file for complete search history.

(56) References Cited

U.S. PATENT DOCUMENTS

| | | | | |
|---|---|---|---|---|
| 2007/0178909 A1* | 8/2007 | Doyle | ................... | G01S 5/0027 455/456.1 |
| 2009/0213557 A1* | 8/2009 | Wen | ....................... | H04R 1/406 361/748 |
| 2009/0261197 A1* | 10/2009 | Cox | ........................ | B64C 25/36 244/50 |
| 2010/0153218 A1* | 6/2010 | Wilson | ................... | G06Q 30/02 705/14.72 |
| 2014/0018111 A1* | 1/2014 | Farley | ................... | H04W 4/023 455/456.6 |
| 2015/0126148 A1* | 5/2015 | Hong | ...................... | H04W 4/02 455/405 |
| 2016/0019499 A1* | 1/2016 | Bhalodia | ............ | G06Q 10/0833 705/40 |
| 2016/0132046 A1* | 5/2016 | Beoughter | ........ | G06F 17/30554 700/17 |
| 2017/0078315 A1* | 3/2017 | Allen | ................. | G06F 17/30598 |
| 2017/0300836 A1* | 10/2017 | Byrne | .................... | G06Q 10/02 |
| 2018/0082260 A1* | 3/2018 | Dunn | ................. | G06Q 10/1093 |

* cited by examiner

*Primary Examiner* — Inder P Mehra
(74) *Attorney, Agent, or Firm* — John L. Sotomayor

(57) ABSTRACT

The present invention is a method and system of determining and assigning a geographic location such as a work or home location to the owner or user of a mobile device. Mobile devices such as smart phones, tablets, internet computers, and other hand held mobile devices may be preferentially targeted for ads based upon the geographic location of the owner or user of the mobile device. The home or work location is determined based upon startup events associated with the mobile device as tracked by startup activations of the mobile device, beacon activations, tile activations, or any other Bluetooth or near field communication device activation, during either day time or night time hours.

15 Claims, 3 Drawing Sheets

US 10,136,408 B1

DETERMINING HIGH VALUE GEOGRAPHIC LOCATIONS

CLAIM OF PRIORITY

This Non-Provisional application claims under 35 U.S.C. § 120, the benefit of the Provisional Application 62/377,982, filed Aug. 22, 2016, Titled "Determining High Value Geographic Locations", which is hereby incorporated by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The smartphone is a mobile device that is a unique technology device in that it is one of the first devices to be almost exclusively individual and personal. Additional mobile devices, such as tablets, iPads, internet capable watches, and other handheld mobile devices, provide similar functions and access to technology to users as they travel or move about on daily errands, much as the smartphone is capable of providing. Such mobile devices have become so useful that they are essential to users and are typically kept on or near the person of each user at all times, with users installing applications that are useful or simply desired so as to be readily available to the user whenever wanted.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
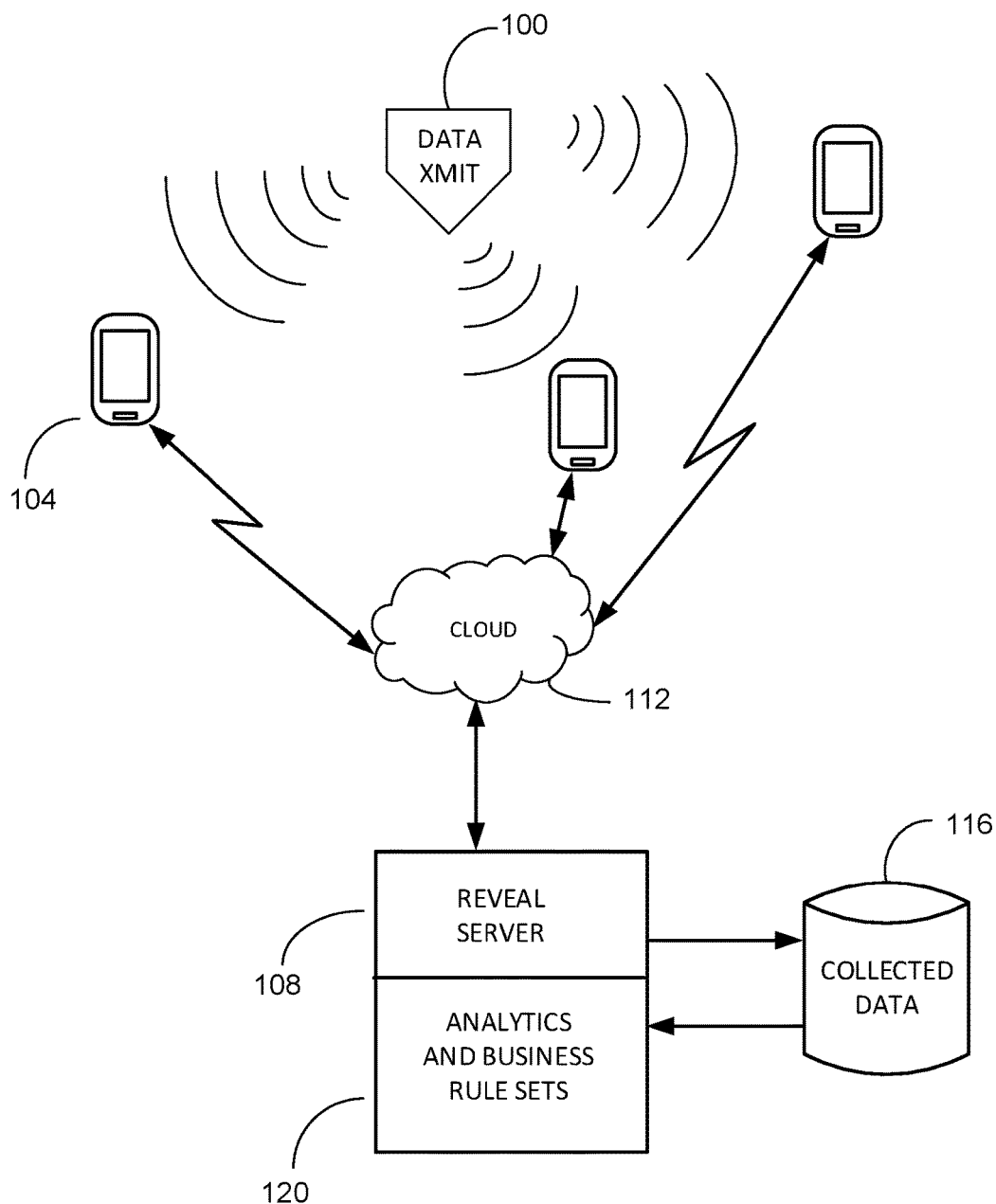
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a point rank algorithm refers to a point rank index and the specific latitude and longitude coordinates for each activation by a proximity activation system.

Reference throughout this document to a beacon refers to a low energy Bluetooth (BLE) device operating as an proximity activation system that transmits packets of data that allow smart devices (such as phones, tablets, computers, handheld devices, game devices, etc.) to be informed when they are in range, and where smart devices are capable of calculating their proximity to the beacon.

Reference throughout this document to a high value geographic location refers to a spatial location having significance to the owner or user of a mobile device. As non-limiting examples, a high value geographic location may be a home, a place of business, a place of worship, or some other location where the owner or user of a mobile device repeatedly spends time.

Reference throughout this document to a trigger event refers to a startup event associated with a mobile device and/or reception of an activation signal from a proximity activation system.

References throughout this document to a daypart refer to a chronological portion of a day from a starting time to an ending time. As non-limiting example, a daypart may represent hours spent working or hours spent at home.

The apps that are installed on a mobile device are a reflection of the user's life, interests, work, lifestyle, and beliefs. Clustering geographic events from a device history to determine high-frequency or other important locations for a device such as work and home locations may be accomplished through activation and use of apps installed on a mobile device. It is unusual for a mobile device to receive signals from a proximity location system while at work or at home. For this reason, determining work and home locations without direct input from a user of a mobile device is difficult. However, aggregating activation events for a mobile device and analyzing patterns associated with home events and work events based upon machine learning algorithms utilizing feedback information from a geographical database engine may provide information on work and home physical locations.

Mobile applications do not utilize cookies. In common practice, cookies track the locations a user visits across the web through the mechanism of placing a small tracking file, or cookie, within a user's computer system making it simple to capture demographic information about the user of the device. These cookies are usable by the application or web page that placed it within the cookie folder on the user computer file system. In a non-limiting example, because cookies can't track digital locations in mobile devices, physical location like latitude and longitude coordinates or activation by a proximity activation system must be used as a replacement for the cookie mechanism to determine locations that users visit in the real world and to collect demographic and use information while the mobile device is active.

Utilizing location information gathered from a proximity activation system, such as a beacon, provides highly accurate location information for a mobile device that comes within range of the beacon's signal. In a non-limiting example, when a mobile device detects a Beacon's signal, an application on the mobile device uses the Received Signal Strength Indication (RSSI), which is compared against a pre-set distance to signal strength ratio, to determine proximity to the Beacon as well as the accuracy of its estimation of proximity. The stronger the signal, the more confident the mobile device can be about the proximity of the Beacon. Refining the location of a mobile device may require a location determination system to increase location accuracy.

A mobile device having the Reveal™ API downloaded will track and manage gathered information about the user or owner of the mobile device. When a user enters the signal range of a beacon, or when the Reveal™ app is opened or activated, an event is triggered and sent to the Reveal™ application server. The event is the signal recorded in the database associated with the Reveal™ application server and transmits the location information in terms of latitude and longitude values when the event occurs. The latitude and longitude values represent the GPS location of the mobile device when the event is triggered.

In an exemplary embodiment, an event is a "startup" event if the location information associated with the event is sent to the Reveal™ application server when the user of the mobile device initiates the Reveal™ app on the mobile device and there is no signal from a proximity activation system. The startup events are the most valuable in terms of discovering location such as work and home due to the fact that most users of mobile devices will open one or more applications when starting their work shift, or when changing from home status to work status, or when changing from work status to home status. When analyzing all points of geographic data that are associated with startup and proximity activation events, the algorithm determines the order of clusters of startup and activations in terms of size, where the size of a circle representing a cluster is proportional to the number of events in that cluster. The biggest cluster may be assigned reasonably as the home location of the mobile device because a user will generate startup events most often from the home location. Another check to provide greater confidence in the determination of a home location for the mobile device may be a periodic city check over time, so as to remove likelihood of going on a trip or on vacation as deterministic of home. Thus, when analyzing aggregated events for any particular mobile device, the events that are of greatest interest in determining home and/or work locations are startup events.

In the exemplary embodiment, a mobile device typically transmits latitude and longitude data regarding the location of the mobile device on a regular basis. Because the latitude and longitude data for the mobile device indicates the true path taken by a user, certain patterns associated with the location coordinates may be determined by analyzing the accumulated event data. Thus, when attempting to determine the home and work locations for a user associated with a particular mobile device, the Reveal™ application server may use aggregated startup event data accrued by the mobile device over a period of time.

In an exemplary embodiment, the Reveal™ system may determine the device home location by first filtering out the startup events for the device during a time when the mobile user is more likely to be found at home. This is done by clustering the latitude and longitude information for each activation of the startup event data and obtaining the feedback from the geographical database information for each startup event. The geographical database information returns an indication of whether the location is residential or not residential based on the latitude and longitude information included with the query. Using this information, a learning model is constructed to perform an analysis on the stored data and determine when the mobile user resides at home and when the user is at work. Upon completion of each work/home determination, the event data and the work or home determination data are provided to the Reveal™ system algorithms for additional analysis.

In this exemplary embodiment, all of the events discovered from this filter process are transmitted to a point rank algorithm residing and operating on the Reveal™ application server. The point rank algorithm creates a point rank index that provides an index threshold for the value of the event with regard to all events associated with the mobile device, and provides the specific latitude and longitude coordinates captured upon activation of the app and for each startup event. The Reveal™ server initiates an activation algorithm to analyze each startup event to assess when the startup events should be included in the determination of a home location assignment for the mobile device. In order to be assigned a home location, a mobile device should exceed the point rank index threshold pre-configured by the system. Exceeding the point rank index provides a degree of confidence in the prediction of the home location assignment to the mobile device.

In this exemplary embodiment, as additional events accrue, a typical mobile device would be scanned for events that contribute to the verification of the assignment of home location on a regular, recurring basis. As additional events are detected, the point rank algorithm analyzes the accumulated event data to contribute additional data points to the determination of the home location assignment. As additional event data points are added to the determination of the home location assignment, the event data points serve as a check on the determination and improve the confidence level of the home assignment prediction by the Reveal™ server.

In an exemplary embodiment, just as the home location may be determined a similar process may be performed to predict and assign a work location for a user associate with a mobile device. Just as the largest cluster of startup events over time may be deterministic of a home location, the second largest, that is consistent and repetitive over time, may be most deterministic of work location for the mobile device. Determining a person's work location can be a very difficult task. Usually there are fewer startup events at work because the user doesn't check their mobile device at work as often, and most work places that are office buildings generally do not have installed beacons which would generate a beacon bump. The process to determine the work location for the mobile device, and, by association, the work location for the user associated with the mobile device, begins by filtering startup events captured for the device during business hours associated with a particular work shift. The Reveal™ server may be configured with a certain time span as "normal" business hours for that particular work shift. The time span for "normal" business hours may be denoted as set (B). The time span for home hours may be denoted as set (H), and the total hours in a day is denoted as set (T). The business hours are then given by:

$$Set(B)=set(T)-set(H).$$

The Reveal™ server analysis module then clusters the events that are associated with business hours using the Density Based Spatial Clustering And Noise (DBSCAN) algorithm. DBSCAN returns a result of a visual representation for each cluster of events as a circle with the diameter of the circle being directly proportional to the number of events within a cluster that are associated with the mobile device. In this non-limiting example, the circle representing a cluster of 5 events would be approximately half the size of the circle representing a cluster of 10 events. The Reveal™ server analysis module then selects the cluster having a circle with the largest diameter and captures all of the events that contribute to the selected cluster. The selected events are provided to the point rank algorithm in the Reveal™ server analysis module and the point rank module returns the point rank index and the specific latitude and longitude that represent the center point of the circle for the selected cluster. In this exemplary embodiment, the Reveal™ server may assume that the work location is associated with the point rank result that exceeds the point rank index threshold and that is the cluster with the largest number of events during business hours. If the calculated point rank index exceeds the point rank index threshold, a work location assignment for the mobile device may be assigned to the latitude and longitude associated with the selected cluster.

In an exemplary embodiment, the Reveal™ application server may utilize the home and work location information derived from the point rank analysis in combination with a logged recorded history for the mobile device to create one or more predictive recommendations for subscribers and users of the Reveal™ system. In this exemplary embodiment, the application server may have an installed module that analyzes the beacon activations geographical location in relation to the time of day to determine activities associated with a physical path over time. With this feedback and verification signal, the application server may communicate a particular message, ad, or other signal to the relevant mobile device associated with the home and/or work location established for the user or owner of a mobile device.

In an embodiment, mobile device users who perform a particular activity on a routine or highly frequent basis are those individuals for whom marketing is unnecessary. However, incentives may be presented to such mobile device users in an attempt to increase wallet spend. Such incentives may be more effective for a female gender, or more effective for a male gender dependent upon the design of the incentive and the goal of any incentive program. The ability to target mobile devices associated with a particular home or work location increases the ability to deliver geographic and/or workplace motivated incentives. Incentives may also be presented when an analysis of behaviors of such frequently encountered mobile device users provides an indication that the mobile device user activity, as measured by beacon interactions, is decaying over time. Such incentives may be presented not to increase wallet spend, but to attract and retain such customers to retail establishments in proximity to the beacons with which the user interacts. This increases the customer lifetime value and is an important metric in marketing activities.

In a non-limiting example, the Reveal™ system may have a priority queue, separate from the main persona tracking database, that creates and presents incentives to such high priority targeted mobile device users. If a mobile device user is recognized as frequenting a certain area or retail establishment, based upon beacon activations, the one or more personas assigned to that mobile device may be identified as high priority customers and may be placed in the priority queue. This priority queue may be set up as a business rule to deliver ads to mobile devices in locations that have been identified as high priority. In a non-limiting example, a home location may be used to determine the delivery of specific political ads to individuals whose home location places them in a geographic location in which they are represented by a particular politician, or in which a particular referendum may be taking place. This priority queue may be created and maintained separate from the main persona database.

In this non-limiting example, the application server may be able to provide, for a small fee or other consideration, predictive information on the likely purchases at any particular shopping location or performance venue to permit the generation of "instant savings" coupons, special deal ads, or informational messages tailored for specific geographic locations associated with that mobile device.

In an embodiment, the Reveal™ application server may integrate with a plurality of advertising servers. This direct communication pathway will permit tracking and management of every advertising and informational message delivered to every device within the sphere of the advertising server. The direct integration with advertising servers may strengthen attribution reporting and permit stronger correlations between delivered messages and mobile devices. This data may be collected in one or more Reveal™ and/or advertising server databases and managed by one or more Reveal™ analytics management processes. The data collected may provide for the creation of location based metrics for particular mobile devices, or may provide information that may be used to target classes of mobile devices based upon work or home location.

This analytic information may be used to create predictive advertising for the mobile devices. In this process, advertising data may be targeted for delivery to a mobile device based upon predictions of future intent for each mobile device based upon home and/or work locations associated with mobile devices.

In an embodiment, a system is presented for determining and assigning high value geographic locations to a mobile device with one or more mobile devices are in communication with an application server and one or more applications. The operation of the system is initiated on the occurrence of a trigger event, as previously defined, the system storing the notification of a trigger event in a relational database maintained in an electronic storage element associated with the mobile device, including storing received physical location data, an identifier associated with the mobile device, and a timestamp associated with said trigger event in the relational database. The application server analyzes startup events recorded in the relational database to determine one or more high value geographic locations and assigns the one or more high value geographic locations to the mobile device, and/or to a persona associated with the one or more mobile devices. The system displaying the determined one or more high value geographic locations on a display associated with the application server.

In an embodiment, a trigger event consisting of a startup event or reception of an activation signal from a proximity activation system, where the startup event is an event initiated by the initiation of one or more applications when the mobile device is not within range of a proximity activation system. The analysis of startup events is performed by the application server to detect spatial clustering of the physical location data associated with a daypart. The analysis of startup events performed by the application server further comprises constructing a learning model to increase the confidence level of the one or more high value geographic locations, determining that the one or more high value geographic locations have changed, and/or determining that the times defining the daypart have changed.

In an embodiment, the one or more high value geographic locations may be a home location or a work location. The system may make available the one or more high value geographic locations for use by other applications active on the mobile device via an Application Program Interface (API) utilizing one or more sets of analysis and business rules, where the application server software analyzes the one or more high value geographic locations, the one or more sets of analysis and business rules, a current date and time, and a current location to determine a notification or message to deliver to the mobile device and delivering said notification or message.

Turning now to FIG. 1, this figure presents a system diagram for an exemplary system configuration consistent with certain embodiments of the present invention. A proximity activation system 100 may transmit a signal, such as a beacon or a GPS transmission, to a mobile device 104. A startup event is recorded in a mobile device 104 when the user starts the Reveal™ application. A bump is an activation indication from the proximity activation system 100 that is transmitted to the Reveal™ application server 108 when a mobile device upon which the Reveal™ SDK has been installed. Additional activation events may be recorded when received from Bluetooth or other near field communication devices, such as, in a non-limiting example, tile activations from one or more tile beacon devices. When a bump or other beacon device is detected or startup activation occurs, the beacon information, containing at least the location and identification information for the beacon device, or the GPS location information is transmitted to the Reveal™ application server 108 through one or more cloud servers 112. Alternatively, when startup activation is performed, the Reveal™ application transmits an indication of the startup activation and transmits any bumps recorded while the mobile device was inactive. The application server 108 stores the transmitted bump, beacon activation, and startup information in a relational database 116 containing all of the collected data from all mobile devices, either as a new entry into an activation data table or as an update to an entry already stored in the activation data table. The application server 108 also adds geographical data, the latitude and longitude, for the beacon into a data table, if the bump source is a beacon transmission. Additionally data regarding the mobile device manufacturer, operating system type and other metrics are stored in a separate data table on the application server 108.

After the application server 108 has completed a refinement calculation for the geographical location of the proximity activation system 100, the application server 108 may seek to identify the location in which the proximity activation system 100 has been installed. In a non-limiting example, the application server 108 may contact a places identification service 116, such as one or more publicly available geographical databases, through the API and present the physical location information to check the type of place in which the proximity activation system 100 is operating. Once the type of place is returned from the places identification API, this information is stored in the relational database 116 and associated with that particular beacon.

The Reveal™ Server 108 may also contain one or more sets of analysis and business rule 120 to determine a location that should be identified with a user or owner of each mobile device that reports a bump with a particular proximity activation system 100.

Upon the conclusion of this operation, the Reveal™ system has a table of bump information and associated data regarding the number of startup activations and mobile device activations near the proximity activation system 100, the type of place in which the proximity activation system 100 is installed, and the precise physical location of the proximity activation system 100 within that location, and has determined and assigned a location based upon a point rank calculation to the owner or user of the mobile device.

Figure 2:
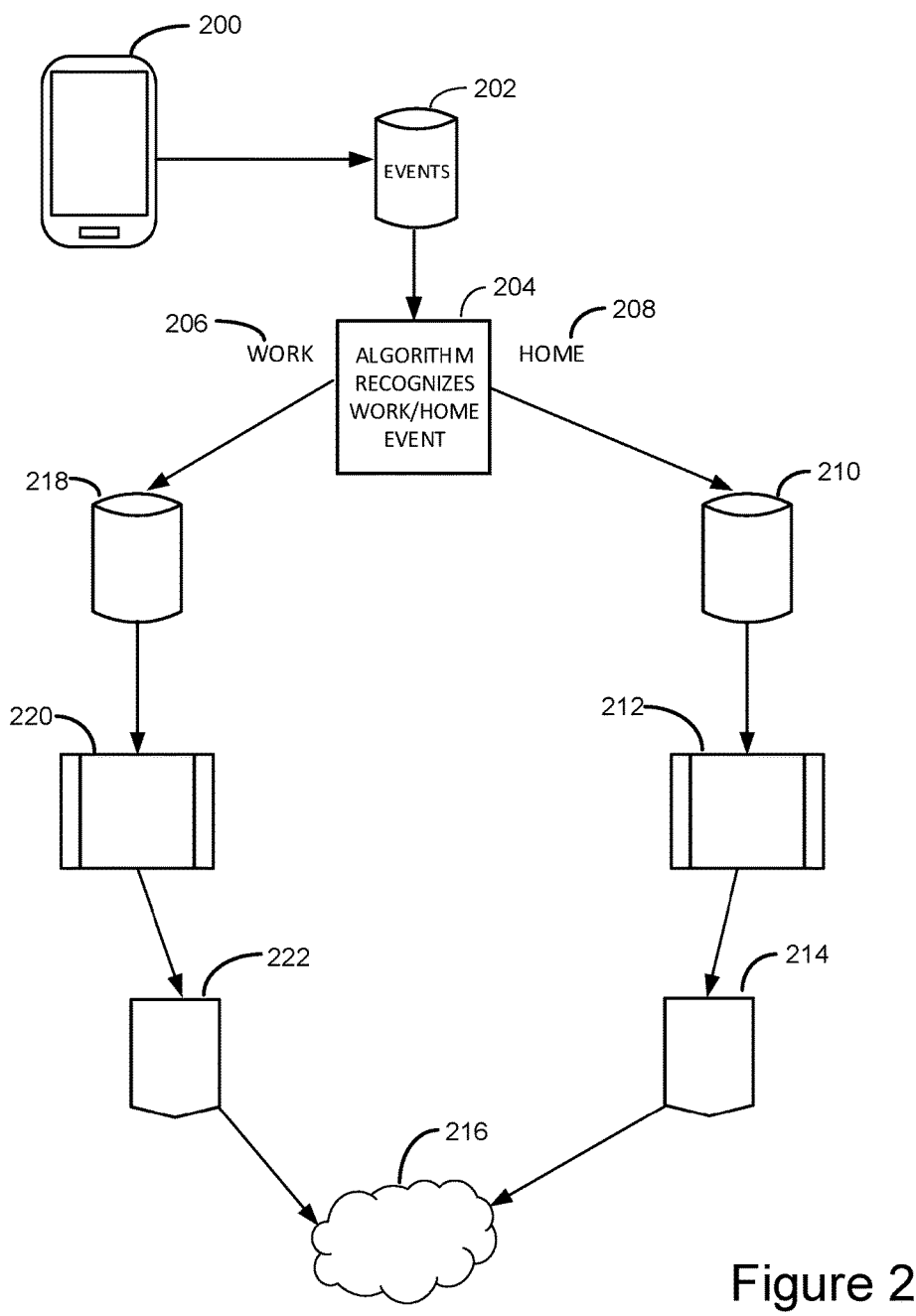
FIG. 2 is a system diagram for capturing and aggregating activations from a mobile device consistent with certain embodiments of the present invention.

Turning to FIG. 2, this figure presents a system diagram for capturing and aggregating activations from a mobile device consistent with certain embodiments of the present invention. One or more mobile devices 200 may connect to the Reveal™ server upon startup. The Reveal™ server captures startup events at 202. At 204 the startup events are analyzed by an algorithm operational on the Reveal™ server to determine whether the startup event is occurring during work hours 206 or home hours 208 for various values of a work shift. The Reveal™ server may designate those hours of the day from evening through the night until morning as home hours 208, and calculate work hours 206 as total hours for a day less the home hours 208. Home hours 208 and work hours 206 may be designated differently for each mobile device based upon the total number of hours a mobile device remains in one location based upon the assumption that a mobile device remains in its home location for the largest number of hours in any 24 hour period. In this calculation, the starting hour and the ending hour for the home hours and for work hours may be configured as certain values based upon time zone, whether daylight savings time is in effect, and other preferred start and stop times identified to the system. The hours designated as home hours or the hours designated as work hours may be referred to as a daypart.

In this exemplary embodiment, if the Reveal™ server determines that the startup event has occurred during home hours 208, the startup event is filtered into the cluster that represents startup events during night hours 208. Startup events are stored within a cluster that represents night hour startup events 210. To identify the physical home location for the mobile device, and, by extension, for the user associated with the mobile device, all of the home hour startup events 210 are passed to the point rank algorithm module 212. The point rank algorithm module analyzes the location latitude and longitude for each of the home hour startup events 210 to determine if the mobile device may be assigned a home location. If the point rank value for the cluster of home hour startup events 210 exceeds the threshold point rank index value, the system may predict with a certain degree of confidence that this physical location may be assigned to the mobile device as a home location.

Once the home location has been assigned to the mobile device, the home location and mobile device information are recorded as being associated with one another 214. The system may also continue to monitor and record home hour startup events 210 to further refine the confidence level of the home location prediction. This monitor function may occur on a routine or regular basis such that the confidence level remains high, or, if the user associated with the mobile device move to a new home location, any new home location may be determined automatically. A new home location would then be assigned to the mobile device. At 216, the home location for the mobile device, the point rank index, and all other data associated with the mobile device are stored within the database maintained by the Reveal™ server.

Alternatively, if the Reveal™ server is attempting to determine a work location for the mobile device, and by extension the user associated with the mobile device, the Reveal™ server first determines which startup events have occurred during work hours 206, the startup event is filtered into the cluster that represents startup events during work hours 218. The work hour startup events 218 are transmitted to the point rank algorithm 220 with the instruction that the work location is generally determined as the startup cluster having the second largest number of startup events occurring during a 24 hour period. The point rank algorithm 220 thus analyzes the clusters using the DBSCAN algorithm to determine the size of each cluster and selects the cluster of the second largest size, in terms of number of startup events during proposed work hours, and a point rank algorithm is used to determine the point rank index for the cluster. If the point rank index of the selected cluster exceeds the point rank threshold setting, the location of the cluster is determined to be the work location with a certain degree of confidence in the prediction. The work location is associated with the mobile device at 222, and the location and startup events continue to be accumulated. The system may also continue to monitor and record work hour startup events 218 to further refine the confidence level of the work location prediction. This monitor function may occur on a routine or regular basis such that the confidence level remains high, or, if the user associated with the mobile device moves to a new work location, any new work location may be determined automatically. A new work location would then be assigned to the mobile device. At 216, the work location for the mobile device, the point rank index, and all other data associated with the mobile device are stored within the database maintained by the Reveal™ server.

Figure 3:
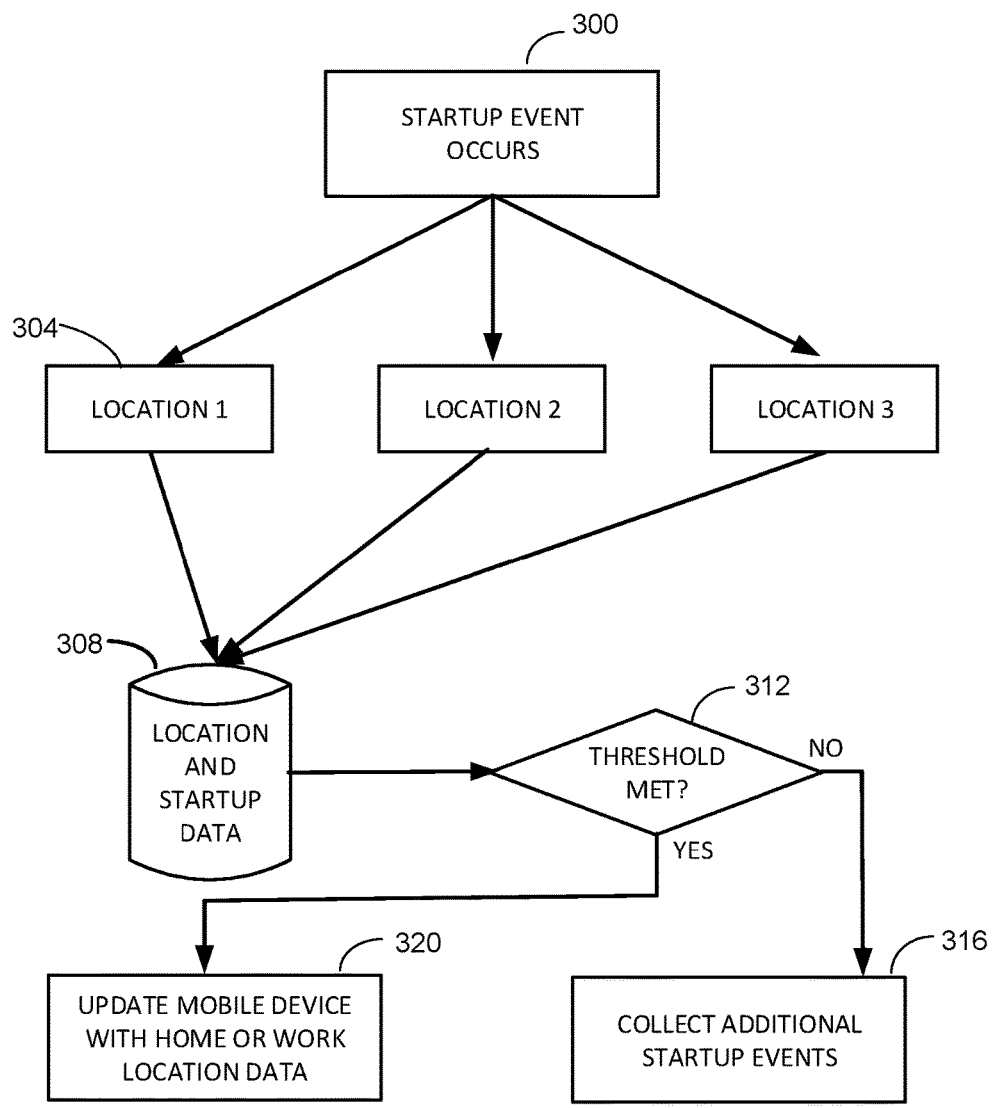
FIG. 3 is a process flow for the determination of work and home geographic locations of the owner or user of a mobile device consistent with certain embodiments of the present invention.

Turning to FIG. 3, this figure presents a process flow for the determination of home or work location of the owner or user of a mobile device utilizing a point rank algorithm consistent with certain embodiments of the present invention. When the Reveal™ app has been installed on a mobile device and the user starts the mobile device or the Reveal™ app a startup activation event is recorded at 300. At 304, the startup activation event is associated with a location collected from the GPS element associated with the mobile device. Each location is recorded as a set of latitude and longitude coordinates associated with the location and this information is transmitted a database maintained on the Reveal™ server. At 308, the startup event data, including the latitude and longitude location information is recorded and maintained in an electronic database associated with the Reveal™ server. This database is later filtered for startup events that occur during daylight hours or night time hours in accordance with previously described embodiments.

At 312, the Reveal™ server initiates the point rank algorithm to determine if the number of recorded and filtered startup events during either the daylight hours or night time hours have met or exceeded a pre-configured index threshold value. If the index threshold value has not been met, it may be an indication that the number of captured and recorded startups events is insufficient to meet the index value. At 316, if the number of captured and recorded startup events is insufficient, the Reveal™ server may wait for additional startup events. At 320, if the number of startup events captured and recorded is sufficient to exceed the pre-configured index threshold value the Reveal™ server may determine the work or home physical location, based upon whether the startup events have occurred during daytime hours or night time hours, and this information is transmitted to the mobile device. If a home or work location has been previously established for a mobile device, additional startup events may be analyzed to determine with greater confidence as to whether the current work or home location value is correct. Additional startup events may also be analyzed to determine if the work or home location has changed and the information may be updated in the mobile device based upon the newly determined work or home location.

While certain illustrative embodiments have been described, it is evident that many alternatives, modifications, permutations and variations will become apparent to those skilled in the art in light of the foregoing description.

What is claimed is:

1. A system for determining and assigning high value geographic locations to a mobile device comprising:
    a mobile device in communication with an application server and one or more applications;
    initiating the operation of the one or more applications on the occurrence of a trigger event;
    storing a notification of said trigger event in a relational database maintained in an electronic storage element associated with the mobile device;
    storing received physical location data, an identifier associated with the mobile device, and a timestamp associated with said trigger event in the relational database;
    the application server analyzing startup events recorded in the relational database to determine one or more high value geographic locations;
    the application server constructing a learning model to increase the confidence level of the one or more high value geographic locations, determining that the one or more high value geographic locations have changed, and/or determining that the times defining the daypart have changed;
    assigning said one or more high value geographic locations to the mobile device;
    displaying the determined one or more high value geographic locations on a display associated with the application server.

2. The system of claim 1, further comprising a trigger event consisting of a startup event or reception of an activation signal from a proximity activation system.

3. The system of claim 2,
    where the startup event is an event initiated by the initiation of one or more applications when the mobile device is not within range of a proximity activation system.

4. The system of claim 1,
    where the analysis of startup events performed by the application server comprises detection of spatial clustering of the physical location data associated with a daypart.

5. The system of claim 1,
    where the one or more high value geographic locations is a home location.

6. The system of claim 1,
    where the one or more high value geographic location is a work location.

7. The system of claim 1,
further comprising making available the one or more high value geographic locations for use by other applications active on the mobile device via an Application Program Interface (API).

8. A method of determining and assigning high value geographic locations to a mobile device comprising:
- a mobile device in communication with a mobile application server;
- initiating the operation of the one or more applications on the occurrence of a trigger event;
- sending an event notification from a mobile device to the mobile application server;
- the application server extracting physical location data and an identifier associated with a mobile device from the notification;
- storing the physical location data and the identifier in a relational database;
- the application server analyzing the contents of the relational database to determine one or more high value geographic locations, and assigning said one or more high value geographic locations to one or more personas resident within said mobile device;
- constructing a learning model to increase the confidence level of the one or more high value geographic locations, to determine that one or more high value geographic locations have changed, or to determine that the times defining the daypart have changed;
- making the one or more high value geographic locations known to other applications within said mobile device; and
- displaying the determined one or more high value geographic locations on a display associated with the application server.

9. The method of claim 8,
further comprising a trigger event consisting of a startup event or reception of an activation signal from a proximity activation system.

10. The method of claim 8,
where the step of storing the physical location data and the identifier in a relational database further comprises time stamping the entries prior to storing said entries in the relational database.

11. The method of claim 8,
where the step of analyzing the contents of the relational database to determine one or more high value geographic locations comprises filtering relational database entries to include only startup events in the analysis.

12. The method of to claim 8,
where the step of analyzing the contents of the relational database to determine one or more high value geographic locations comprises detecting spatial clustering of the physical location data.

13. The method of claim 12,
where the step of analyzing the contents of the relational database comprises determining one or more high value geographic locations based upon spatial clustering of physical data associated with a daypart.

14. The method of claim 8,
where the step of making the one or more high value geographic locations known to other applications comprises publishing the one or more high value geographic locations through an Application Program Interface (API).

15. The method of claim 8,
further comprises determining an advertising message to deliver to a mobile device.

* * * * *